(12) United States Patent
Guldstrand et al.

(10) Patent No.: US 7,971,925 B2
(45) Date of Patent: Jul. 5, 2011

(54) AIR DEFLECTOR

(75) Inventors: Peter Guldstrand, Harryda (SE);
Ann-Charlotte Karhag, Jonsered (SE)

(73) Assignee: Volvo Car Corporation, Gothenburg (SE)

( * ) Notice: Subject to any disclaimer, the term of this patent is extended or adjusted under 35 U.S.C. 154(b) by 279 days.

(21) Appl. No.: 12/412,483

(22) Filed: Mar. 27, 2009

(65) Prior Publication Data
US 2009/0243334 A1    Oct. 1, 2009

(30) Foreign Application Priority Data

Mar. 28, 2008  (EP) .................................. 08153625

(51) Int. Cl.
*B60J 7/22*   (2006.01)
(52) U.S. Cl. .................................. 296/180.1
(58) Field of Classification Search ............... 296/180.1, 296/180.2, 180.3, 180.4, 180.5
See application file for complete search history.

(56) References Cited

U.S. PATENT DOCUMENTS 7,357,441 B2 * 4/2008 Queveau et al. ........... 296/180.1
7,481,177 B2 * 1/2009 Hearne ....................... 296/180.1

FOREIGN PATENT DOCUMENTS

DE      588 549 C    11/1933
DE   197 32 699 A1    2/1999
DE   101 56 019 A1    6/2003

* cited by examiner

*Primary Examiner* — Lori L Lyjak
(74) *Attorney, Agent, or Firm* — Gigette M. Bejin

(57) ABSTRACT

An air deflector adapted to be attached to the upper windshield crossbeam of a convertible vehicle. The air deflector includes a top surface, a front portion, an outer side portion, an inner side portion and a rear wing portion. The rear wing portion extends upwards from the top surface. The air deflector may further include a locking device adapted to lock the air deflector in the locking arrangement for the retractable top.

10 Claims, 5 Drawing Sheets

AIR DEFLECTOR

TECHNICAL FIELD

This application claims the priority of the European Patent Application EP 08153625.2 having a filing date of Mar. 28, 2008, the entire content of which is herewith incorporated by reference.

The present disclosure relates to an air deflector adapted to direct wind from the back seat area of a convertible passenger car. The air deflector is especially useful when passengers are riding in the back seat of the vehicle.

BACKGROUND

In convertible cars, both the ones with a removable top and with a retractable or foldable top, there will be a more or less turbulent wind flow in the passenger compartment when driving with the top removed or down, i.e. with the car open. The amount of wind flow within the passenger compartment area is dependent on the speed of the vehicle.

Different measures have been taken to reduce the wind drag for the driver and passenger in the front seats of an open car. One common measure is to implement a windblocker behind the front seats, extending up to the region of the head of the driver and passenger. The windblocker effectively reduces turbulence for the front seat occupants when the vehicle is driven with the top down in the stowed position. The windblocker improves the comfort for the driver and passenger.

A windblocker of this kind may comprise one or more pieces and may be either removable or fixed in the vehicle. Different materials have been proposed, e.g. plastic, glass and fabric. These solutions work well for cars having just two front seats or for cars where only the front seats are occupied. However, such traditional windblockers do not reduce air turbulence for passengers in the back seats.

When driving in moderate speeds with the top down, e.g. on a main road, the side windows may be down and stowed within a vehicle door. This arrangement results in a lot of turbulence around the driver compartment. However, this will at the same time reduce the direct wind flow on the passengers in the rear seats. When driving at higher speeds, e.g. on a motorway, the side windows are often raised in order to reduce wind turbulence and wind noise. In this case, there will be quite a lot of turbulence in the back seat, especially in the region where the passengers have their heads. This will both give a passenger wind draft in the face and induce noise in the ears.

Accordingly, the inventors of the present disclosure have discovered a need to reduce air turbulence in the back seat of an open vehicle.

SUMMARY

The present disclosure provides an air deflector for a convertible car that reduces air turbulence in the rear seat area according to the embodiments disclosed herein. The present disclosure also provides an air deflector that is easy to fasten and to remove. The air deflector may be operatively configured to be attached to the upper windshield crossbeam of a convertible vehicle. The air deflector includes a top surface having a front portion, an outer side portion, an inner side portion and a rear wing portion. The rear wing portion may extend upwards from the top surface. The air deflector may further include a locking device which is operatively configured to lock the air deflector in the locking arrangement for the retractable top.

BRIEF DESCRIPTION OF DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The embodiments of the present disclosure with further developments described in the following are to be regarded only as non-limiting examples and are in no way to limit the scope of the protection provided by the patent claims. The air deflector 1 described below may be adapted to be mounted on the left side of the vehicle 2, as seen in the driving direction of the vehicle 2 (see FIG. 1). Thus, only the left side of the vehicle 2 is described. A similar, but mirror-inverted, air deflector 1 adapted to be mounted on the right side of the vehicle 2 is likewise included in the description. In the examples below, the vehicle 2 is a left-hand drive vehicle 2.

Figure 1:
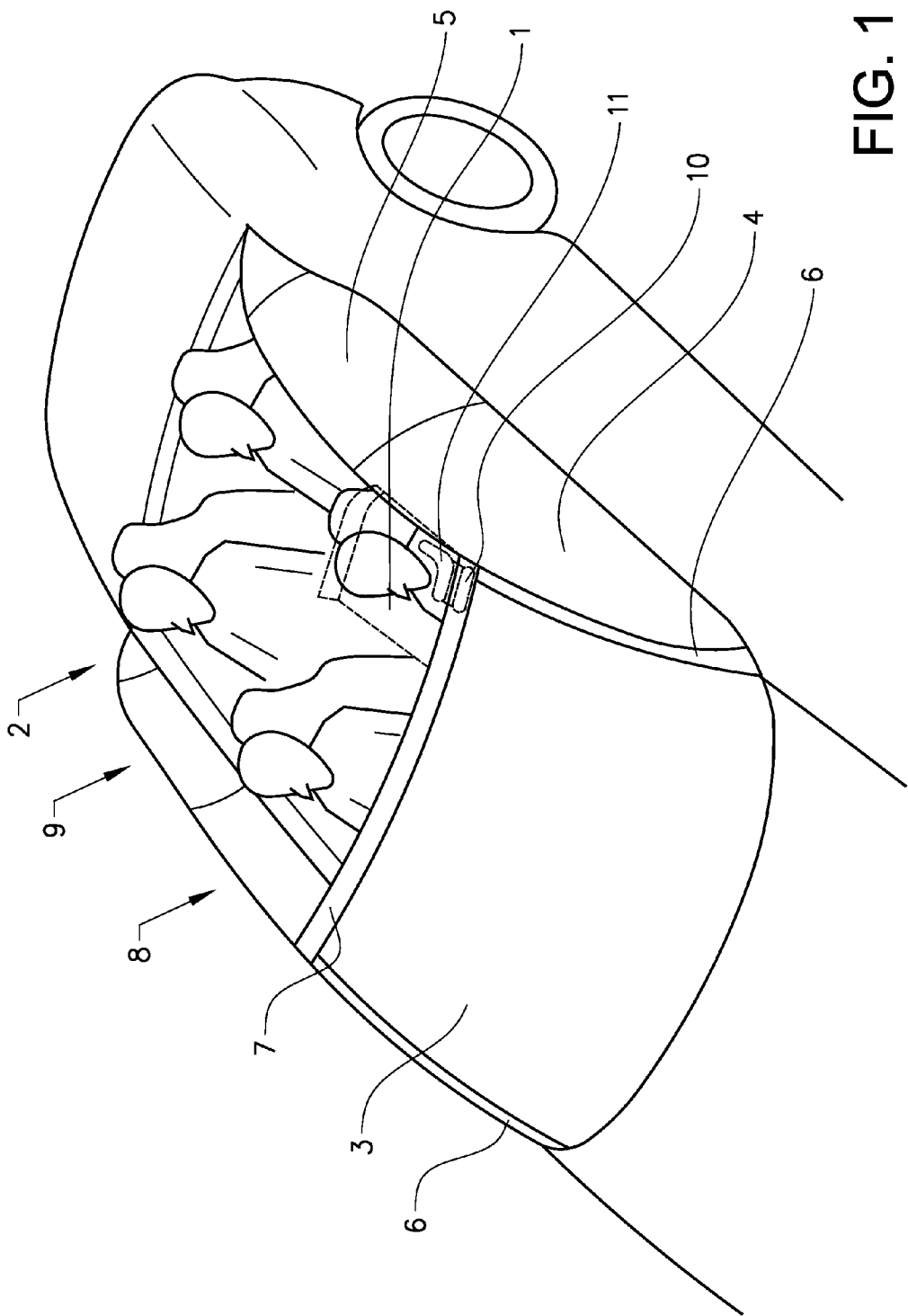
FIG. 1 shows a perspective view of a convertible car with an air deflector according to the present disclosure.

With reference to FIG. 1, an example of a convertible vehicle 2 with the top (not shown) down is shown. The vehicle 2 comprises a front windshield 3 and side windows, both a front side window 4 and a rear side window 5. The windshield 3 is delimited by the A-pillars 6 and an upper front crossbeam 7. The coupé of the vehicle 2 comprises a front section 8 in which the driver and passenger seats are located, and a rear section 9 in which the rear seats are located. In the crossbeam 7, at least two locking arrangements 10 are located. There is one locking arrangement 10 positioned in the region close to each A-pillar 6. The locking arrangements 10 are used to lock the retractable top (not shown) to the crossbeam 7 when it is in the deployed or raised positioned. The locking arrangements 10 may comprise a sensor (not shown) that detects if the top (not shown) is in place and if the locking arrangement 10 is in the locked position. In this way, it can be ensured that the retractable top (not shown) is in position and is locked in a proper way.

The vehicle 2 in FIG. 1 also comprises an air deflector 1. The air deflector 1 is positioned at the corner between the crossbar 7 and the front side window 4. The air deflector 1 comprises a locking device 11 that is operatively configured to cooperate with or join with the locking arrangement 10 in order to attach the air deflector 1 to the vehicle 2.

The front portion 12 of the air deflector 1 is shaped in the same way as the upper cross beam of the vehicle 2. In this way, the shape of the air deflector 1 will follow the shape of the vehicle 2 when the air deflector 1 is mounted to the vehicle 2. This will improve the appearance of the air deflector 1 and will reduce wind noise. Sideways, the air deflector 1 will extend over less than half of the crossbeam 7 when it is mounted to the vehicle 2. The air deflector 1 may extends over a distance of between a fourth and a third of the width of the windshield crossbeam 7.

The outer side portion 13 of the air deflector 1 extends rearwards from the front portion 1 2 for at least a third of the length of the front side window 4 when the air deflector 1 is mounted at the vehicle 2 at the upper crossbeam 7. The air deflector 1 may also extends over between a third and the whole of the front side window 4. In this way, the air deflector 1 will cover part of the front section 8 of the driving compartment. The rear wing portion 15 of the air deflector 1 includes a wing shape that extends upwards from the top surface 16 of the air deflector 1. The wing shape 15 will guide the wind (not shown) upwards so that the wind does not blow down into the rear seat section 9 of the vehicle 2.

Figure 2:
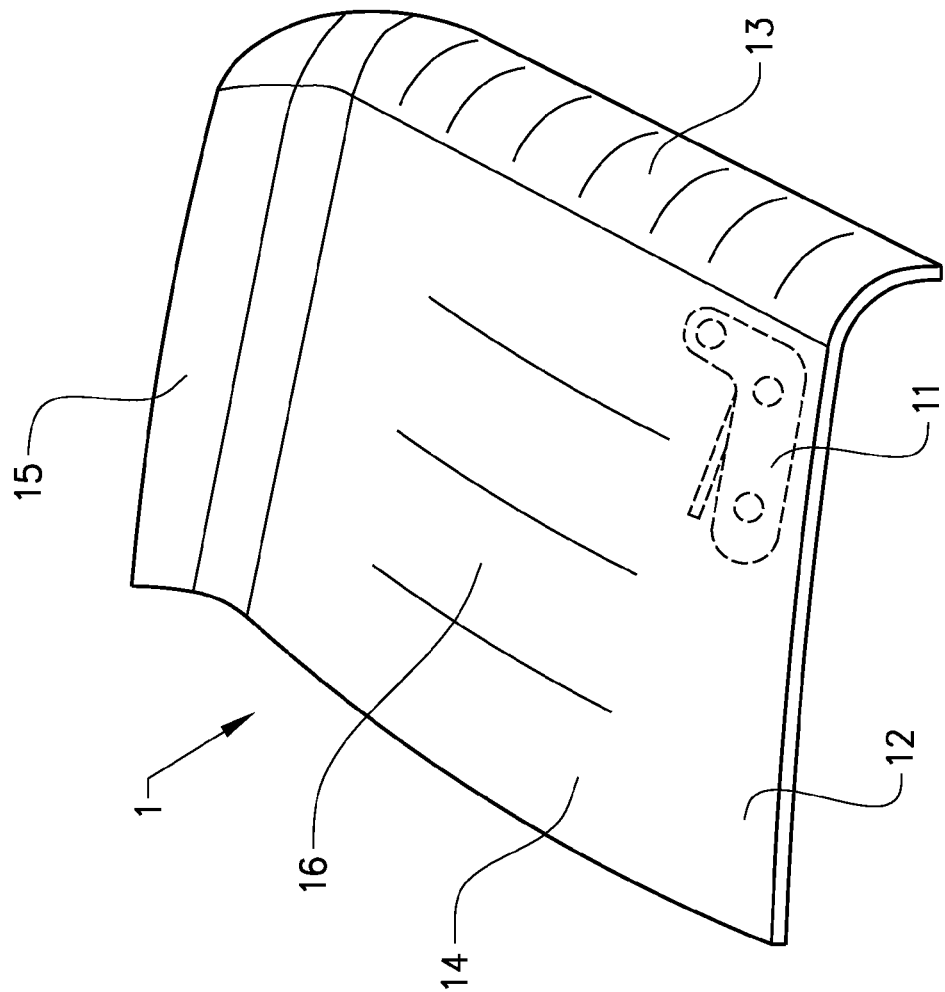
FIG. 2 shows a perspective view of an air deflector according to the present disclosure.

The shape of the top surface 16 of the air deflector 1 may resemble the shape of the retractable top (not shown) for the same position. However, it is to be understood that other shapes may be implemented, such as but not limited to a horizontal shape that is similar to but not identical to the retractable top (not shown). With reference to FIG. 2, the top surface 16 of the air deflector 1 is in this example slightly bent in a convex manner, substantially following the curvature of the upper edge of the side window 4. The convex shape of the top surface 16 of FIG. 2 will give a smooth transition from the shape of the windshield 3 to the air deflector 1. Accordingly, the vehicle 2 styling may be enhanced and the flow pattern of the air deflector 1 will follow the shape of the vehicle 2.

The outer side portion 13 of the air deflector 1 extends to and follows the upper edge of the side window 4. The outer side portion 13 extends in this example over the side window 4 edge when seen from above of the vehicle 2 and also extends at least down to the edge of the side window 4 in a vertical direction.

The outer side portion 13 may extend a distance further down over the side window 4, covering the upper edge of the side window 4. The outer side portion 13 of the air deflector 1 can have the same shape and curvature as the side of the retractable top. By letting the air deflector 1 extend down over the edge of the side window 4, the gap between the air deflector 1 and the side window 4 will be closed. This will reduce the wind flow to the rear seat section of the vehicle 2 and will also reduce the noise created by the wind. The edge of the outer side portion 13 may also be provided with a sealing so that the air deflector 1 can bear on the side window 4 and so that an air tight joint is obtained.

If the outer side portion 13 of the air deflector 1 has the same shape and curvature as the side of the retractable top, (i.e. the air deflector 1 follows the curvature of the side window 4), the outer side portion 13 will extend down over the side window 4. Since the side window 4 of a convertible vehicle 2 does not have a window frame, the window 4 itself will bear on the retractable top (not shown) when it is raised or deployed. In order to create a leakage free connection between the top and the side window 4, it is possible to let the window enter a groove in the retractable top. In this way, a tight fit is achieved. With the window in the groove, it will however be impossible to open the door. This is solved by automatically dropping the window 4 slightly before the door is opened, clearing the window from the groove (not shown). This function may be achieved using a motor in conjunction with the window system. The same mechanism is used when the outer side portion 13 of the air deflector 1 extends down over the side window 4 and the door is to be opened.

If the vehicle 2 is not equipped with a window 4 that retracts somewhat when the door is opened, the air deflector 1 should not extend down over the side window 4. In this case, the air deflector 1 may extend almost down to the same height as the side window 4, or may extend down under the upper side of the window but on the inside of the window.

The rear wing portion 15 is located at the rear end of the air deflector 1. The height of the wing shape of the rear wing portion 15 depends on e.g. the length of the air deflector 1, the curvature of the top surface 16 of the air deflector 1 and on the length of the coupé, i.e. the position of the passenger compartment in relation to the air deflector 1. The wing shape of the rear wing portion 15 may have the same height over the complete width of the air deflector 1, or may have a varying height across the width of the rear wing portion 15. The wing shape may e.g. be as high as the top surface 16 at the outer side portion 13 and rise from there, having its greatest height at the inner side portion 14.

The shape of the air deflector 1, as seen from above, may be approximately rectangular, may have a somewhat triangular delta-shape, or may have a shape in between the two wherein the shape is a hybrid of a rectangle and a triangle. The shape of the front portion 12 may be determined by the shape of the windshield 3 of the vehicle 2. The shape of the outer side portion 13 may be determined by the shape of the side window 4. However, the shape of the inner side portion 14 and the rear wing portion 15 may be varied. In the first example, the inner side portion 14 is roughly parallel to the outer side portion 13 and the rear wing portion 15 is roughly parallel to the front side portion 12, as seen in FIG. 2.

In a further example, the shape of the air deflector 1, as seen from above, may be approximately triangular. In this example, the inner side portion 14 and the rear wing portion 15 both form a continuous convex shape. The wing shape may in this example extend more or less to the front portion 12 and may have a varying height. The air deflector 1 shape may be more or less triangular, i.e. the angle between the inner side portion 14 and the rear wing portion 15 may vary between zero degrees, giving a straight edge, and 90 degrees, giving a rectangular shape. Also the position where the two portions join may be freely varied. The exact shape of the air deflector 1 and the shape of the wing 15 may be determined by simulations or by wind tunnel tests.

The air deflector 1 may be manufactured in a plastic material. In one preferred embodiment, the air deflector 1 is made form a clear and rigid plastic. It is of advantage that the air deflector 1 will not bend due to the wind when the vehicle 2 is driven, regardless of the speed. However, the air deflector 1 may bend some at high speeds, since normally a convertible car is not driven at excessive speeds but at a comfortable cruising speed. The air deflector 1 should be formed from sufficiently rigid material so that the air deflector 1 does not start to self-oscillate. The oscillation of the air deflector may induce noise and may weaken the air deflector 1. Since the air deflector 1 is only attached to the vehicle 2 at the front edge 17 of the air deflector 1, the front portion 12 must be rigid.

Figure 5:
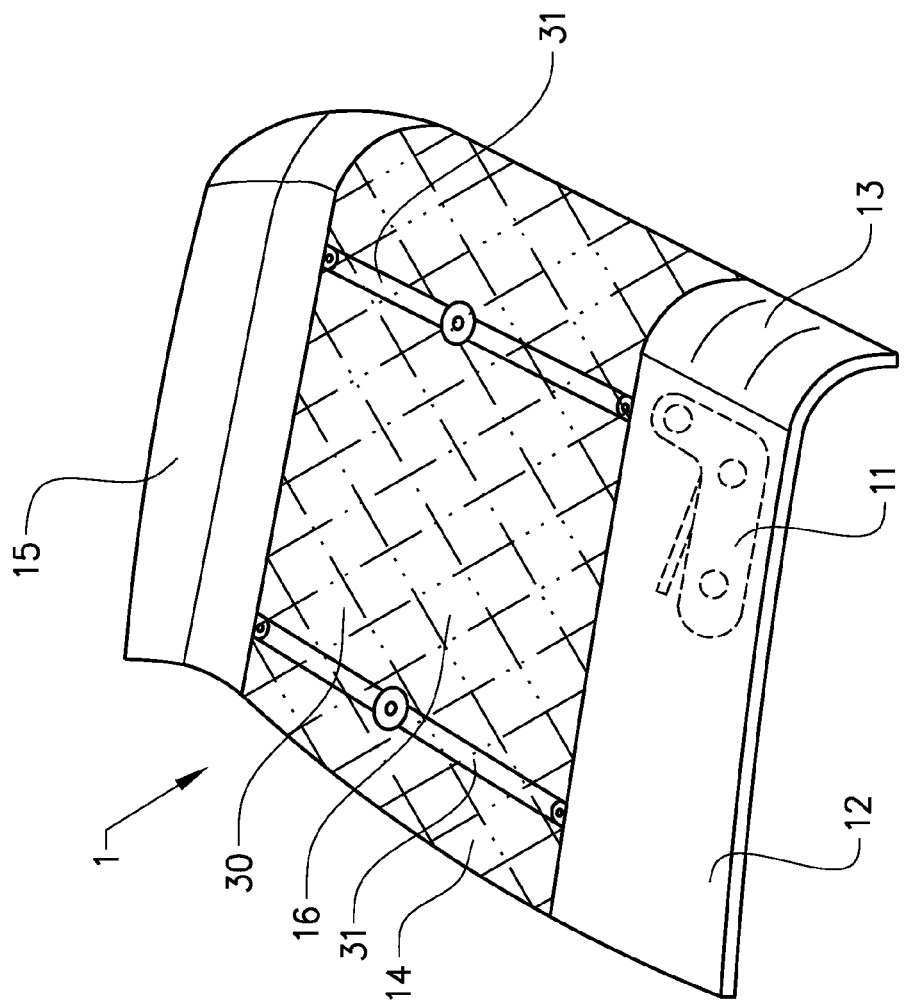
FIG. 5 shows a second embodiment of an air deflector according to the present disclosure.

In a further embodiment, the air deflector 1 is foldable. Such an air deflector 1 is shown in FIG. 5 and comprises a rigid front portion 12, a rigid rear wing portion 15 and a flexible mid section 30. The front and rear sections 9 are interconnected with one or more struts 31, allowing the air deflector 1 to be locked in an extended position. There are different ways to connect the front portion 12 to the rear portion. In one example, the struts 31 are rigid and fastened in the front and rear portion in a pivoting way. In this example, the air deflector 1 folds sideways. With foldable struts 31, e.g. by also providing a hinge in the middle of each strut, the air deflector 1 will fold with the front portion 12 and rear portion 15 next to each other. Removable struts, telescopic struts and the like may also be implemented in the system of the present disclosure. It is important that the folding and unfolding of the air deflector 1 is easy and safe and that the extended air deflector 1 is stable so that it is not deformed by the air flow. By providing a foldable air deflector 1, the storage of the air deflector 1 will be facilitated.

The mid section 30 may be comprised a fabric that is more or less windproof. The purpose of the air deflector 1 is to guide the wind, and thus a fabric that is not completely windproof can be used. Thus, different woven mesh materials may be suitable. A foldable air deflector 1 is easier to store in the vehicle 2 when not in use. The fabric may cover the complete air deflector 1. By using a fabric with the same colour as the vehicle 2, a pleasant design solution is reached.

Figure 3:
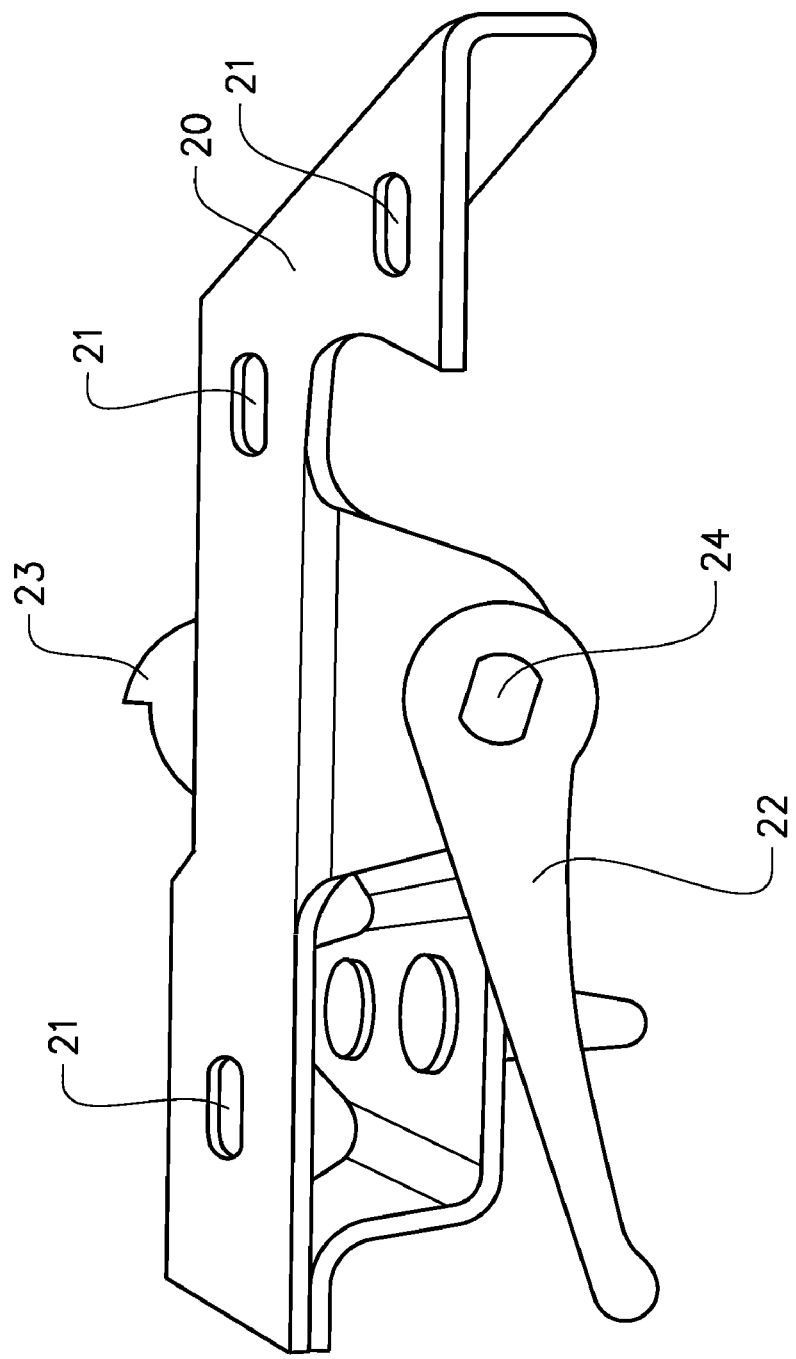
FIG. 3 shows a front view of the locking device for the air deflector according to the present disclosure.
Figure 4:
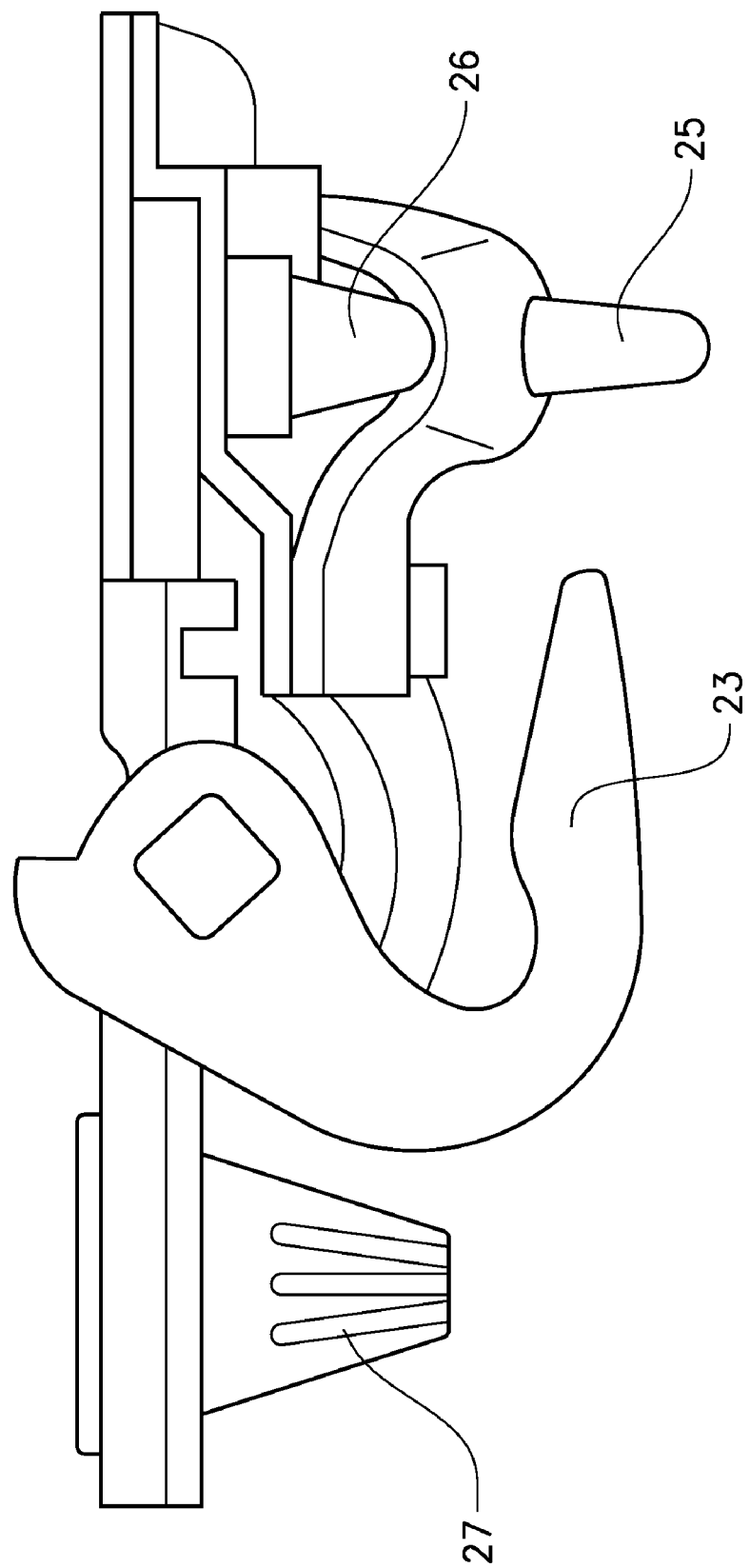
FIG. 4 shows a rear view of the locking device for the air deflector according to the present disclosure.

Referring to FIGS. 2-4 together, the locking device 11 is fixed to the air deflector 1 at the front portion 12 of the air deflector 1. The locking device 11 may be fixed to the air deflector 1 with an appropriate means, e.g. glue, screws, rivets, etc. It is possible to integrate a reinforcement means in the air deflector 1 in order to stabilize the mounting of the locking device 11. The reinforcement may e.g. be a metallic part that at the same time can be used as a design element in the air deflector 1. The locking device 11 comprises means to enable a quick and easy mounting and dismounting of the air deflector 1 to the vehicle 2.

The locking device 11 comprises a lock body 20, a first pin 25 and a second pin 26 and a hook 23 with a lever. The first pin 25 and second pin 26 will fit the openings (not shown) for the locking arrangements 10 in the crossbeam 7, where the retractable top (not shown) locks in. When the pins 25, 26 are inserted in the openings of the crossbeam 7, the lever can be turned which will engage the hook 23 with a locking pin of the locking arrangement 10. This will secure the air deflector 1 to the vehicle 2. The locking device 11 may comprise a further pin in order to reduce the play of the locking device 11 when it is attached to the vehicle 2.

The locking device 11 comprises a lock body 20 having a plurality of mounting openings 21. The mounting openings 21 are used to fixate the locking device 11 to the air deflector 1 when the locking device 11 is fixated with mounting means such as screws or rivets. The mounting openings 21 may also cooperate with protruding elements of the air deflector 1 when the locking device 11 is fixated with glue. This will on the one hand help with the positioning of the locking device 11 and on the other hand help to take up rotary forces acting on the glue joint. The locking device 11 further comprises a lever arm 22 and a locking hook 23 interconnected with an axle 24 journalled in the lock body 20. The lock body 20 comprises a first locating dowel pin 25 and a second locating dowel pin 26. The first locating dowel pin 25 and the second locating dowel pin 26 are adapted to interact with corresponding openings in the locking arrangement 10 of the vehicle 2. One or both of the locating dowel pins may have a somewhat pointed shape, which will help to reduce tolerances of the system and therefore to allow for a secure fastening of the locking device 11 to the locking arrangement 10. The lock body 20 may further comprise a resilient element 27, which will be somewhat compressed when the air deflector 1 is attached to the vehicle 2. The resilient element 27 will compensate for tolerances in the system and will help to stabilise the mounted air deflector 1.

The air deflector 1 is attached to the vehicle 2 in the following way. The air deflector 1 is held in position at the left corner at the crossbeam, where the windshield 3 and the side window 4 meet. The locating dowel pins are introduced into the openings of the locking arrangement 10 and the air deflector 1 is firmly pressed downwards so that the air deflector 1 is properly positioned in the locking arrangement 10. The lever arm 22 is thereafter turned so that the locking hook 23 engages with a corresponding locking pin in the locking arrangement 10. The lever arm 22 is turned completely to the end stop of the locking device 11. During the turning of the lever arm 22, the resilient element 27 is compressed somewhat which will take up tolerances in the locking system and thus allows for a play free attachment of the air deflector 1 to the vehicle 2. The resilient element 27 will stabilize the air deflector 1 during use.

The locking arrangement 10 may comprise a sensor (not shown) that detects if a locking device 11 is mounted in the locking arrangement 10. The vehicle 2 may further comprise a sensor (not shown) that detects if the retractable top is down. The control system of the vehicle 2 may also include a sensor (not shown) that detects if an air deflector 1 is mounted in the locking arrangement 10. This is done by sensing that the top is down and that something is still mounted in the locking arrangement 10. This can be used to prevent the deployment of the top (not shown) to the raised or deployed position. The locking arrangement 10 may further comprise a sensor that detects if the lever arm 22 is turned to the end stop. If the lever arm 22 is not turned sufficiently, a warning signal may be emitted by the locking arrangement.

The present disclosure is not to be regarded as being limited to the embodiments described above. It is to be understood that a number of additional variants and modifications are possible within the scope of the subsequent patent claims.

Therefore, as indicated, in an advantageous development of the air deflector 1 according to the present disclosure, the outer side portion 13 may extend downwards from the top surface 16. This allows the air deflector 1 to overlap the side window 4 of the vehicle 2, which will reduce the wind flow to the rear seat section and which will also reduce the noise induced. By closing the gap between the air deflector 1 and the side window 4, a advantageous flow pattern is achieved.

It is also to be understood that the actuator or locking device 11 of the present disclosure provides a cheap and cost-effective solution. The rotational motion of the driving device is transferred into a linear motion, so that the movable element is moved in a linear manner.

It is also to be understood that the air deflector 1 may be made from a plastic material. The plastic material is advantageously rigid. By using a clear plastic material, the air deflector 1 will be less noticeable when in use. Furthermore, plastic material is cheap and easy to form in any desired shape.

As indicated in yet another embodiment of the present disclosure, the front portion 12 and the rear wing portion 15 of the air deflector 1 are connected to each other by a plurality of struts 31. By using struts 31 to connect the front and rear portions of the air deflector 1, a foldable air deflector 1 is obtainable. The advantage of this is that a foldable air deflector 1 is easier to store in the vehicle 2. As indicated earlier, the struts 31 may also be foldable. The advantage of implementing foldable struts 31 is the ease of storage in a vehicle 2.

While multiple embodiments of the present disclosure have been described in detail, it will be apparent to those skilled in the art that the disclosed embodiments may be modified. Therefore, the foregoing description is to be considered exemplary rather than limiting.

The invention claimed is:

1. An air deflector mounted on an upper windshield crossbeam of a convertible vehicle, the air deflector comprising:
   a top surface;

a front portion;
an outer side portion;
an inner side portion;
a rear wing portion extending upwards from the top surface; and
a locking device operatively configured to lock the front portion to an upper windshield crossbeam.

2. The air deflector defined in claim 1 wherein the outer side portion extends downwards from the top surface.

3. The air deflector defined in claim 1 wherein the top surface is convex.

4. The air deflector defined in claim 1 wherein the air deflector is formed from a plastic material.

5. The air deflector defined in claim 1 wherein the front portion and the rear wing portion are connected to one another by a plurality of struts.

6. The air deflector defined in claim 5 wherein the struts are foldable.

7. The air deflector defined in claim 5 further comprising a midportion between the front portion and the rear wing portion, the midportion consisting of a flexible material.

8. The air deflector as defined in claim 7 wherein the flexible material is a woven fabric.

9. The air deflector as defined in claim 1 wherein the air deflector has a substantially rectangular shape.

10. The air deflector as defined in claim 1 wherein the wing shape of the rear wing portion extends into the inner side portion.

* * * * *